(12) United States Patent
Schorr et al.

(10) Patent No.: US 9,829,314 B2
(45) Date of Patent: Nov. 28, 2017

(54) MEASURING APPLIANCE COMPRISING A DYNAMIC SIGHTING FUNCTIONALITY AND ASSOCIATED METHOD

(75) Inventors: Christian Schorr, St. Gallen (CH); Frank Schroeder, St. Gallen (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 177 days.

(21) Appl. No.: 13/993,014

(22) PCT Filed: Jan. 10, 2012

(86) PCT No.: PCT/EP2012/050300
§ 371 (c)(1),
(2), (4) Date: Jun. 10, 2013

(87) PCT Pub. No.: WO2012/095415
PCT Pub. Date: Jul. 19, 2012

(65) Prior Publication Data
US 2013/0278752 A1   Oct. 24, 2013

(30) Foreign Application Priority Data
Jan. 11, 2011   (EP) .................................... 11150580

(51) Int. Cl.
*G01C 11/00*   (2006.01)
*G01C 15/00*   (2006.01)

(52) U.S. Cl.
CPC ............ *G01C 11/00* (2013.01); *G01C 15/002* (2013.01)

(58) Field of Classification Search
CPC .. G01C 11/00; G01C 21/3667; G02B 27/648; G02B 2027/0138; G02B 2027/0112;
(Continued)

(56) References Cited

U.S. PATENT DOCUMENTS 7,342,650 B2   3/2008 Kern et al.
7,460,214 B2   12/2008 Schiavi
(Continued)

FOREIGN PATENT DOCUMENTS

DE    4443413    6/1996
DE    19545589   6/1997
(Continued)

OTHER PUBLICATIONS

European Search Report dated Jun. 16, 2011 as received in Application No. EP 11 15 0580.

*Primary Examiner* — Jay Patel
*Assistant Examiner* — Marnie Matt
(74) *Attorney, Agent, or Firm* — Maschoff Brennan (57) ABSTRACT

According to the invention, the construction measuring device has a functionality for modifying the orientation of the sighting unit in a manually controllable manner, within the framework of which the orientation of the sighting unit is dynamically modified by the first or second rotary drive, according to a current direction and a current distance from a defined central anchor display point to a currently marked display point. The respective current direction defines an orientation modifying direction and the respective current distance defines an orientation modifying speed for changing the orientation of the sighting unit.

19 Claims, 3 Drawing Sheets

(58) Field of Classification Search
CPC ...... G03B 17/20; G06T 11/00; H04N 3/1562; H04N 1/32229; H04N 2101/00; H04N 7/152; H04N 1/32208
USPC .......................................................... 348/95
See application file for complete search history.

(56) References Cited

U.S. PATENT DOCUMENTS

| | | | |
|---|---|---|---|
| 8,368,875 B2 | 2/2013 | Kludas et al. | |
| 2005/0021282 A1* | 1/2005 | Sammut | F41G 1/38 702/150 |
| 2006/0158423 A1* | 7/2006 | Kern | G01C 1/04 345/156 |
| 2006/0192946 A1* | 8/2006 | Walser | G01C 1/04 356/144 |
| 2007/0008515 A1* | 1/2007 | Otani | G01C 3/00 356/5.02 |
| 2007/0115545 A1* | 5/2007 | Chen | G02B 23/16 359/429 |
| 2009/0220054 A1* | 9/2009 | Baumann | H01J 35/00 378/205 |
| 2010/0123892 A1* | 5/2010 | Miller | G01C 15/002 356/4.01 |
| 2011/0007939 A1* | 1/2011 | Teng | G06T 7/0075 382/103 |
| 2011/0288818 A1* | 11/2011 | Thierman | G01B 11/00 702/159 |
| 2012/0130675 A1* | 5/2012 | Schorr | G01C 15/105 702/154 |

FOREIGN PATENT DOCUMENTS

| | | |
|---|---|---|
| DE | 196 48 626 | 5/1998 |
| DE | 11 2007 003 284 T5 | 12/2009 |
| EP | 0 481 278 A1 | 4/1992 |
| EP | 1733185 | 12/2006 |
| EP | 2423640 | 2/2012 |
| WO | 2004/036145 A1 | 4/2004 |

* cited by examiner

MEASURING APPLIANCE COMPRISING A DYNAMIC SIGHTING FUNCTIONALITY AND ASSOCIATED METHOD

FIELD OF THE INVENTION

The invention relates to a construction measuring appliance for measuring and/or marking spatial points of surfaces of a construction—in particular interiors of buildings—and to an associated method for the manually controlled alignment of a sighting unit of a measuring appliance on the basis of marking display points on a display, and to an associated computer program product.

BACKGROUND

The prior art discloses simple construction measuring appliances comprising a sighting device, with the aid of which a spatial point, e.g. a corner point, is sighted manually and the sighting direction is then changed manually to a next spatial point to be measured, e.g. a further corner point.

DE 196 48 626 for example discloses a method and an apparatus for area measurement with a laser distance measuring device having a laser transmitter and a laser receiver. The laser distance measuring device is mounted on a stand. The apparatus furthermore comprises a tilting and rotating device for alignment and direction measurement, a telescopic sight and also an electronic evaluation unit for angle data acquisition, distance data acquisition and data transfer to a computer. For measuring a space, the appliance is positioned at a central location in the space, from which all spatial and/or area corner points to be detected can be sighted and impinged upon by the laser beam. In accordance with the disclosure of DE 196 48 626, the spatial points to be measured are in this case each sighted individually, if appropriate—in the case of relatively large distance—with the observation being supported by means of a telescopic sight. An automated sequential measurement of a plurality of spatial points, comparable to a scan, for example, is not disclosed in DE 196 48 626.

A similar apparatus and associated measurement method are disclosed in DE 44 43 413, the supplementary published patent application DE 195 45 589 and WO 96/18083, which claims the priority of DE 44 43 413. They describe a method and an apparatus for measuring and marking on distant lines, areas or in at least partly closed spaces. One or a plurality of relevant spatial points are measured according to in each case two solid angles and the distance relative to a reference location by means of a laser distance measuring appliance mounted in a cardan-type fashion. The laser distance measuring appliance is pivotable about two mutually perpendicular axes equipped with goniometers. In accordance with one embodiment described in said documents, spatial points to be measured are headed for manually and marking points are calculated from the measurement data, on the basis of a predefined relative relation between measurement and marking, said marking points then being moved to automatically by the measuring and marking apparatus.

However, this document also does not disclose an automated sequential measurement of a plurality of spatial points, comparable to a scan, for example.

EP 1 733 185 discloses an apparatus and a method whereby specifically edges on a polygonal, otherwise planar surface are intended to be measured precisely. However, an automated sequential measurement of a plurality of spatial points is not disclosed.

Known construction measuring appliances typically comprise a base, an upper part mounted on the base in a manner rotatable about a rotation axis, and a sighting unit, which is mounted in a manner pivotable about a pivoting axis, having a laser source designed to emit a laser beam, and an imaging detector, for example equipped with an alignment indicating functionality for indicating an alignment of the sighting unit with a spatial point as sighting point, and also a distance determining detector for providing a distance measuring functionality. The alignment indicating functionality can be, for example, a reticle in the view finder of a camera as imaging detector.

Modern, automated construction measuring appliances furthermore comprise rotary drives, which make the upper part and/or the sighting unit drivable in a motorized manner, goniometers and, if appropriate inclination sensors for determining the spatial alignment of the sighting unit, and also an evaluation and control unit, which is connected to the laser source, the distance determining detector and also the goniometers and, if appropriate, inclination sensors.

In this case, the evaluation and control unit is equipped for example with a display having input means for inputting control commands of a user on the display and for representing an image of the imaging detector or camera on the display, wherein the alignment of the sighting unit can be indicated by means of the alignment indicating functionality on the display e.g. by means of overlaying. Functionalities are known in which the input means on the display are designed as four large areal arrows, the marking and touching of which enable a user to change the alignment of the sighting unit in a horizontal or vertical direction. However, changing the alignment in an arbitrary direction, not exclusively in a horizontal or vertical direction, on the basis of such a functionality, can be time-consuming and difficult to handle and not very intuitive to operate.

SUMMARY

The problem addressed by the invention is that of providing a measuring appliance and an associated method for measuring and/or marking spatial points on surfaces of a construction with an improved functionality for changing the alignment of the sighting unit which offers a user increased operating convenience and, in particular, on the basis of which the user can move more rapidly to the desired target point in the space—at least roughly.

This problem is solved by the realization of the characterizing features of the independent claims. Features which develop the invention in an alternative or advantageous manner can be gathered from the dependent patent claims and also the description including the descriptions of the figures.

The invention relates to a measuring appliance (in particular construction measuring appliance) for measuring and/or marking spatial points on surfaces of a construction, in particular interiors of buildings. The appliance comprises a base and a sighting unit, which is rotatable and pivotable relative to the base and provides distance measuring functionality, having a laser source designed to emit a laser beam in the direction of an aiming axis, and a laser light detector and also having an integrated digital camera aligned in the direction of the aiming axis.

In particular, an upper part mounted on the base in a manner rotatable about a rotation axis within an angular range of an azimuthal or horizontal angle is present and the sighting unit is arranged in a manner mounted on the upper part in a manner pivotable about a pivoting axis within an angular region of an elevation or vertical angle.

The measuring appliance according to the invention furthermore comprises an evaluation and control unit, a display for representing an image of the camera, and also input means for marking display points on the display (such that e.g. control commands can be input by a user). In this case, the input means are designed in particular in such a way that—with a specific resolution—points on the entire display (that is to say on the entire display area) can be marked (e.g. analogously to a computer mouse, a touchscreen, a trackball, or the like). As known to the person skilled in the art, in this case although the resolution of markable display points can specifically correspond to the screen resolution (screen pixel) per se, it is equally possible for the resolution of markable display points also to be lower than the resolution of the pixel actually representable on the screen.

In this case, in the operating state, the spatial point respectively currently sighted by means of the aiming axis can be imaged on the display in the image (in a target image point), in particular in a manner indicated on the basis of a reticle.

The appliance comprises a first and second rotary drive, which make the upper part and the sighting unit respectively drivable and alignable in an azimuth angle and an elevation angle. A spatial alignment of the sighting unit relative to the base is detectable by means of two goniometers for determining the horizontal and vertical alignment, i.e. the azimuth angle and the elevation angle. The evaluation and control unit is connected to the laser source, the laser light detector and also the goniometers in order to assign a detected distance to a corresponding alignment (that is to say azimuth and elevation angles detected in this case) and thus to determine coordinates for spatial points. Moreover, the evaluation and control unit is also connected to the camera.

In addition, the appliance—in particular in a manner integrated into the base of the appliance—can optionally be equipped with inclination sensor means, the measurement data of which are then likewise communicated to the evaluation and control unit. Therefore, it is additionally possible to determine the current alignment of the appliance (that is to say an inclination of the base) with respect to the Earth's gravitational field vector and to use it to compensate for the appliance not being installed exactly horizontally. As known to the person skilled in the art, in this case the inclination sensor means can be designed to determine the inclination relative to the gravitational field (or relative to a horizontal plane aligned perpendicularly to the gravitational field) in two directions (that is to say about two axes). By way of example, for this purpose it is possible to use two one-axis inclination sensors or one two-axis inclination sensor (such as optoelectronic spirit level sensors, an optoelectronic oil reservoir or an optoelectronic box level). An example of such an oil-reservoir-like inclination sensor which can be used to determine the inclination at least about two axes is described in detail in the European patent application having the application number EP 10173726.0.

According to the invention, the construction measuring appliance has a functionality (dynamic sighting functionality) in the context of which dynamically in a manner dependent on
  a current direction and
  a current distance
from a defined central anchor display point to a currently marked display point, the alignment of the sighting unit is changed by the first and/or second rotary drive, wherein
  the respective current direction predefines an alignment change direction and
  the respective current distance predefines an alignment change speed
for changing the alignment of the sighting unit.

In particular, the anchor display point can be defined as that display point which represents the position of the aiming axis in the image and thus a target image point, in particular wherein the latter is indicated on the display by a reticle that can be represented in a manner superimposed on the image. Alternatively, however, in the context of the functionality, it can also be provided that the user himself/herself can define an arbitrary display point as the anchor display point.

In this case, the functionality can be configured in such a way that it can be activated by marking the reticle or the display point representing the target image point.

Preferably, the display is embodied as a touch-sensitive touchscreen, on which display points on the entire area of the display can be marked by touch, and the input means are thereby provided.

According to the invention, the alignment of the sighting unit is changed in horizontal and vertical directions in accordance with the direction from the defined central anchor display point to the respective currently marked image point. It is preferably the case here that the alignment is changed with a maximum speed in the case of a maximum distance between the marked image point and the anchor point and the speed of the alignment change is equal to zero, that is to say that no change in direction takes place, if the first and second marked image points coincide, that is to say are identical.

In accordance with one possible embodiment of the construction measuring appliance according to the invention, the display is subdivided into virtual sectors by means of a virtual line grid, said sectors being formed by concentric circular lines around the anchor display point (such as e.g. the center point of the reticle) and radial lines which proceed from the anchor display point and intersect said circular lines. In this case, the sectors correspond to digitized differences for a change in the alignment of the sighting unit from the first sighted spatial point to other spatial points in horizontal and vertical directions, and the alignment of the sighting unit is changed for as long as the other image point in a sector is continuously marked.

In accordance with this embodiment of the invention, the concentric circular lines around the anchor display point correspond to different distances with respect to the currently marked image point, whereby speed levels for the change in direction of the sighting unit are defined, wherein outer circular lines correspond to maximum speed levels, such that the change in direction upon the marking of outer image points, after the activation of the dynamic sighting functionality, takes place with a defined maximum speed, as long as said other image point is marked.

Typically, the distance measuring functionality comprises an electronic distance measuring device.

Optionally, the virtual line grid can be representable in a manner superimposed on a current camera image on the display in a manner visible to a user.

Further subject matter of the invention is a method for the manually controlled alignment of a sighting unit of a measuring appliance on the basis of marking display points on a display, wherein the measuring appliance—as described above—comprises:

a base, the sighting unit, which is rotatable and pivotable relative to the base and provides distance measuring functionality, having a laser source designed to emit a laser beam in the direction of an aiming axis, and a laser light detector and also having an integrated digital camera aligned in the direction of the aiming axis, an evaluation and control unit, the display for representing an image of the camera, and input means for marking the display points, wherein a first and a second rotary drive make the sighting unit drivable and alignable, a spatial alignment of the sighting unit relative to the base is detectable by means of two goniometers, and the evaluation and control unit is connected to the laser source, the laser light detector and also the goniometers in order to assign a detected distance to a corresponding alignment and thus to determine coordinates for spatial points, and is also connected to the camera.

According to the invention, in the context of the method, constantly a current direction and a current distance from a defined central anchor display point to a currently marked display point are determined. The alignment of the sighting unit is then changed dynamically in a manner dependent on the respective current direction and the respective current distance by the first and/or second rotary drive, wherein the respective current direction predefines an alignment change direction and the respective current distance predefines an alignment change speed for changing the alignment of the sighting unit.

All of the developments described initially with regard to the measurement appliance according to the invention are analogously also applicable to the method according to the invention.

Thus, once again e.g. the anchor display point can be defined as that display point which represents the position of the aiming axis in the image and thus a target image point, in particular wherein the latter is indicated on the display by a reticle that can be represented in a manner superimposed on the image.

Likewise, again the alignment change direction for changing the alignment of the sighting unit can be chosen analogously to the respective determined current direction from the anchor display point to the currently marked display point, wherein the alignment change direction contains an upwardly directed component—that is to say the sighting unit is pivoted upward about a horizontal pivoting axis—if the current direction from the anchor display point to the currently marked display point contains an upwardly pointing component—that is to say if the currently marked display point on the display is situated above the anchor display point, the alignment change direction contains a downwardly directed component—that is to say the sighting unit is pivoted downward about the horizontal pivoting axis—if the current direction from the anchor display point to the currently marked display point contains a downwardly pointing component—that is to say if the currently marked display point on the display is situated below the anchor display point, the alignment change direction contains a leftward directed component—that is to say the sighting unit is rotated leftward about a vertical rotation axis—if the current direction from the anchor display point to the currently marked display point contains a leftward pointing component—that is to say if the currently marked display point on the display is situated to the left of the anchor display point, and the alignment change direction contains a rightward directed component—that is to say the sighting unit is rotated rightward about a vertical rotation axis—if the current direction from the anchor display point to the currently marked display point contains a rightward pointing component—that is to say if the currently marked display point on the display is situated to the right of the anchor display point.

Furthermore, the dependence of the alignment change speed on the respective current distance can be defined in such a way that the movement (that is to say rotation and/or pivoting) of the sighting unit is effected with maximum available speed if the current distance from the currently marked display point to the anchor display point is maximal, and when the currently marked display point coincides with the anchor display point, the alignment change speed is equal to zero, that is to say that a pause is then made in the current alignment of the sighting unit.

Further subject matter of the invention is a computer program product comprising program code, stored on a machine-readable carrier, for carrying out the method according to the invention for the manually controlled alignment of a sighting unit of a measuring appliance on the basis of marking display points on a display according to one of the embodiments mentioned above, in particular if the program is executed on an electronic data processing unit embodied as an evaluation and control unit of the above-described measuring appliance according to the invention.

The present invention allows an operator to change the alignment of the sighting unit in a simple manner. It is not necessary to sequentially input commands for an alignment change in horizontal and vertical directions, rather the sighting unit can, according to the invention, be moved in any desired, e.g. diagonal, direction by means of simple marking on the display (in addition, the chosen direction and speed for the movement can be continuously adapted and changed dynamically by displacement of the marking (i.e. marking of a different display point)).

BRIEF DESCRIPTION OF THE DRAWINGS

The construction measuring appliance according to the invention and the method according to the invention for measuring and/or marking spatial points in a construction are described in greater detail purely by way of example below on the basis of concrete exemplary embodiments illustrated schematically in the drawings, and further advantages of the invention are also discussed. Specifically in the figures.

DETAILED DESCRIPTION

Figure 1:
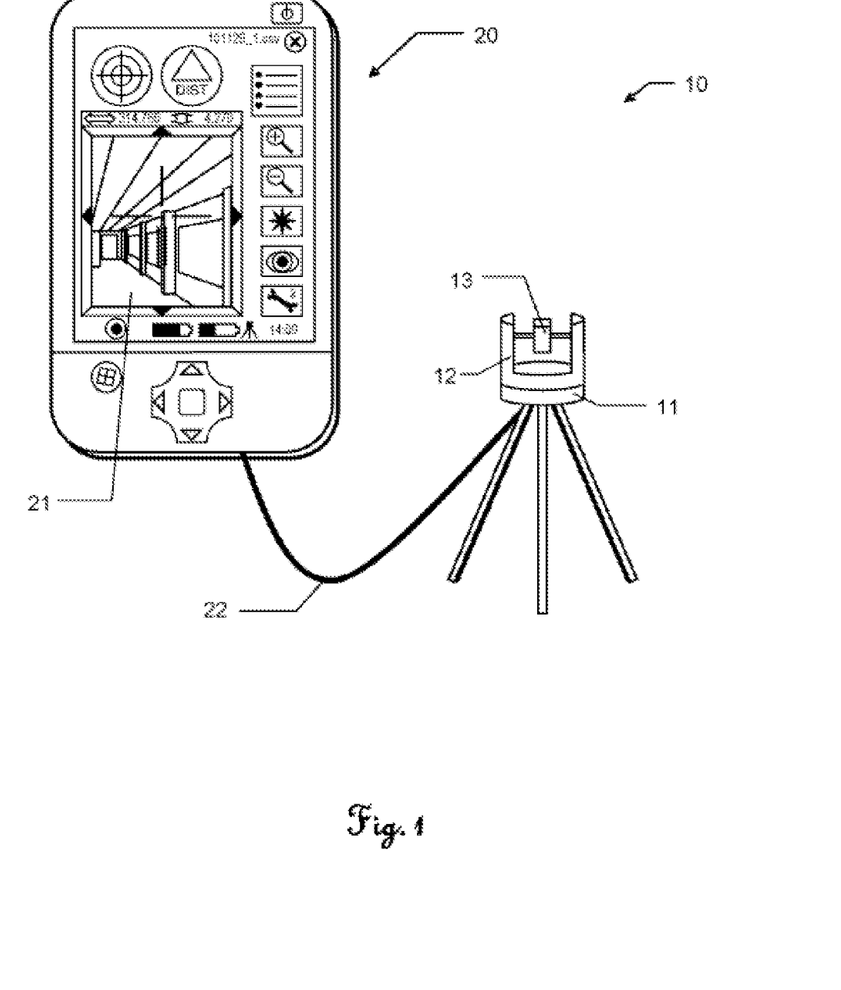
FIG. 1 illustrates a first illustration for a possible embodiment of a construction measuring appliance according to the invention.

FIG. 1 shows one possible embodiment of a construction measuring appliance 10 according to the invention. The system 10 comprises a supervisory unit 20 having an integrated evaluation and control unit for processing the data and having a touch-sensitive touch display 21 for displaying data/camera images and for marking display points (and inputting commands). The supervisory unit 20 (as user-appliance interface) and a laser light detector or sensor communicate with one another. The supervisory unit 20 and the laser light detector or sensor can be physically separate and be connected to one another by means of wireless or cable-based communication connections 22 or can be provided as one unit. In order to align the laser beam 14 with spatial points to be measured or to be protected, at least the laser beam 14 can serve as a measurement beam itself. In order to support an operator for sighting a spatial point, the construction measuring appliance 10 can additionally be equipped with a direct optical sighting aid, e.g. a telescope.

Figure 2:
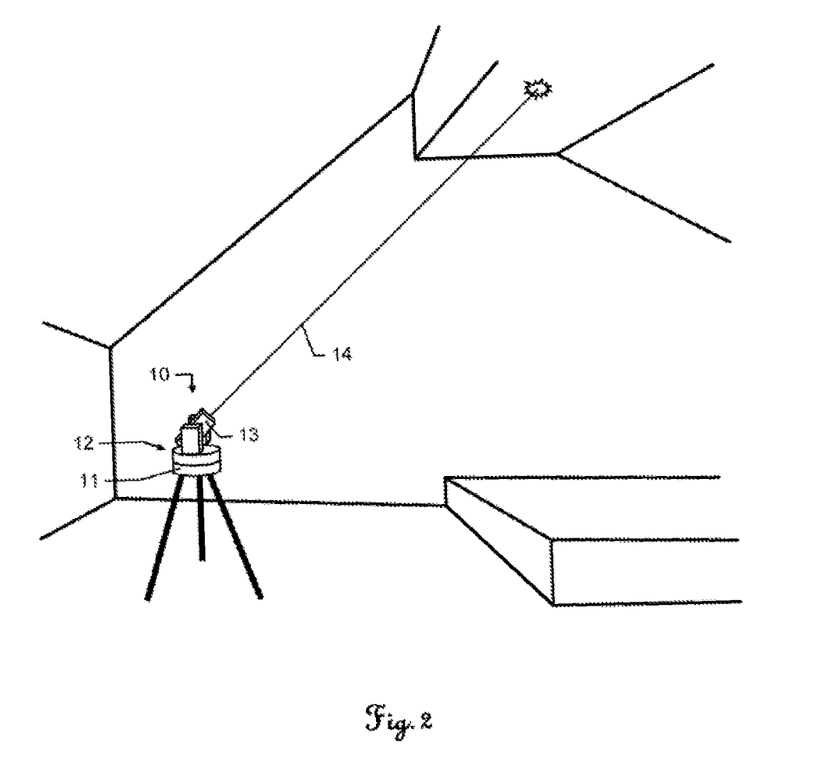
FIG. 2 illustrates a second illustration for a possible embodiment of a construction measuring appliance according to the invention.

FIG. 2 illustrates a measuring appliance 10 according to the invention for measuring and/or for marking spatial points of surfaces of a construction, in particular of interiors of buildings.

The construction measuring appliance 10 comprises a base 11, which is supported for example on a tripod stand, with an upper part 12 mounted thereon in a rotatable manner. A sighting unit 13 mounted on the upper part 12 in a pivotable manner is equipped with a laser source designed to emit a laser beam 14, and a laser light detector as distance determining detector, and thus provides a distance measuring functionality. The sighting unit 13 furthermore comprises an integrated digital camera.

Consequently, the sighting unit 13 is therefore rotatable and pivotable relative to the base 11 (that is to say in particular rotatable about a vertical axis and pivotable or inclinable about a horizontal pivoting axis).

The construction measuring appliance 10 additionally comprises an evaluation and control unit (not illustrated), wherein—likewise not illustrated—a first and a second rotary drive make the upper part 12 and the sighting unit 13 respectively drivable and alignable in an azimuth angle and an elevation angle. The spatial alignment of the sighting unit 13 relative to the base 11 is detectable by means of two goniometers. In addition, provision can be made of inclination sensors for determining the installation alignment or horizontality of the base 11 relative to the Earth's gravitational field vector. The evaluation and control unit is connected to the laser source, the laser light detector and the goniometers—and also, if appropriate, the inclination sensors—in order to assign a detected distance and detected azimuth and elevation angles to a corresponding alignment of the sighting unit 13 and thus to determine coordinates for spatial points. Moreover, the evaluation and control unit is connected to the camera.

In this case, in the operating state, the spatial point respectively currently sighted by means of the aiming axis 13 can be imaged on the display in the image (in a target image point), in particular in a manner indicated on the basis of a reticle that can be represented.

The camera image, into which therefore the reticle can be inserted at that location in the image which corresponds to the aiming axis, therefore serves in particular for sighting the desired target points in the space and can be displayed e.g. on the display of a remote control unit, which can be handheld, for the construction measuring appliance (in particular as a live video stream).

As known to the person skilled in the art, the evaluation and control unit and also the display and the input means can either be arranged directly on the base of the appliance and/or be integrated into a remote control unit, which can be handheld. The measuring appliance can therefore have (either exclusively or in addition to a user interface with display and input means which can be arranged directly on the base) a remote control unit with input means and display.

According to the invention, the measuring appliance 10 now has a dynamic sighting functionality, in the context of which the user can manually give control commands for changing the alignment of the sighting device relative to the base. The dynamic sighting functionality can be configured in such a way that it can be activated by marking the target image point or the reticle on the display. After the dynamic sighting functionality has been activated, a user can mark a display point 4 on the display. As a result, a dynamic change in the alignment of the sighting unit 13 is instigated by virtue of the azimuthal and/or elevational alignment being changed in a motor-driven manner—in accordance with the currently determined direction and the currently determined distance from the defined central anchor display point to the respective currently marked display point.

Upon cancellation of the marking, for example upon cancellation of the touching of the display point 4 on a display embodied as a touchscreen (see FIG. 3), the movement of the sighting unit 13 is terminated. However, a user can—if the functionality still remains activated—at any time mark or touch a different display point in order to instigate a change in alignment, which then in turn corresponds to the current direction and the current distance from the central anchor display point to this marked different display point.

Figure 3:
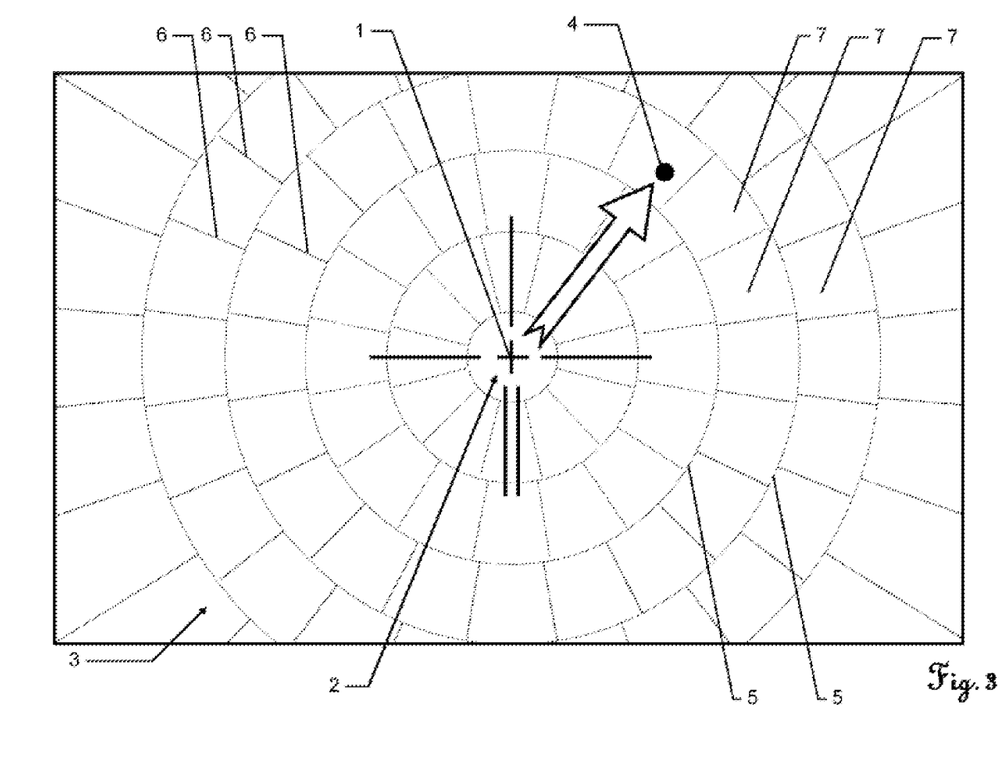
FIG. 3 shows the functioning of the dynamic sighting functionality of the construction measuring appliance according to the invention and of the associated method according to the invention on the basis of an example.

In this case, the alignment change direction for changing the alignment of the sighting unit is dynamically dependent on the respective currently determined direction from the center point of the reticle (which can be defined e.g. as the central anchor display point) to the currently marked display point 4. That is to say that in this case the alignment change direction is dynamically set analogously to the respective current direction from the anchor display point to the currently marked display point. Consequently, when the alignment of the sighting unit is changed analogously to the respective currently determined direction (from the center point of the reticle to the currently marked display point 4), it is evident that the alignment change direction is chosen/set in a manner containing an upwardly directed component—that is to say the sighting unit is pivoted upward about a horizontal pivoting axis—if the current direction from the anchor display point to the currently marked display point contains an upwardly pointing component—that is to say if the currently marked display point on the display is situated above the anchor display point, the alignment change direction is chosen/set in a manner containing a downwardly directed component—that is to say the sighting unit is pivoted downward about a horizontal pivoting axis—if the current direction from the anchor display point to the currently marked display point contains a downwardly pointing component—that is to say if the currently marked display point on the display is situated below the anchor display point, the alignment change direction is chosen/set in a manner containing a leftward directed component—that is to say the sighting unit is rotated leftward about a vertical rotation axis—if the current direction from the anchor display point to the currently marked display point contains a leftward pointing component—that is to say if the currently marked display point on the display is situated to the left of the anchor display point, the alignment change direction is chosen/set in a manner containing a rightward directed component—that is to say the sighting unit is rotated rightward about the vertical rotation axis—if the current direction from the anchor display point to the currently marked display point contains a rightward pointing component—that is to say if the currently marked display point on the display is situated to the right of the anchor display point.

In this case, the alignment change speed for changing the alignment of the sighting unit is set dynamically depending on the respective currently determined distance from the currently marked display point 4 to the center point of the reticle (which can be defined e.g. as the central anchor display point), in particular wherein, as the distance between the currently marked display point and the anchor display point increases, the sighting unit is in each case moved with increasing alignment change speeds.

In this case, the speed of the change of alignment can be predefined as maximal in the case of maximal distance between the marked display point 4 and the target image point 1 or center point of the reticle (as anchor display point)—i.e. when marking outer display points on the display—and can be chosen to be equal to zero if the currently marked display point 4 coincides with the target image point 1 or center point of the reticle as anchor display point. That is to say that, in the latter case, no change in the alignment of the sighting unit 13 (that is to say no movement of the sighting unit) is effected.

As from the

In accordance with the embodiment of the invention as illustrated in FIG. 3, the display is subdivided into a virtual line grid 3, corresponding to digitized distances and directions from the target image point 1 or the center point of the reticle to groups of display points. In the embodiment in accordance with FIG. 3, the virtual line grid 3 is formed from concentric circular lines 5 around the center point of the reticle and radial lines 6 which proceed from the center point of the reticle and intersect said circular lines, such that the display is thereby divided into sectors 7—each containing a group of a plurality of display points. In this case, the sectors 7 in each case correspond to concrete values for the alignment change direction and alignment change speed when changing the alignment of the sighting unit 13 (that is to say that the display points lying within a sector are in each case assigned the same concrete value for the alignment change direction and alignment change speed). The alignment of the sighting unit 13 is changed in a vertical and, in particular simultaneously, horizontal direction, in the direction of the different marked image point 4—located in a sector corresponding to a different spatial point to be sighted, for as long as said different image point is continuously marked. Upon cancellation of the marking, for example upon cancellation of the touching of the image point 4 on a display embodied as a touchscreen, the movement of the sighting unit 13 is terminated. However, a user can at any time mark or touch a different display point in a different sector 7 in order to instigate a change in the alignment of the sighting unit 13 in accordance with the direction and speed assigned to this sector for changing the alignment.

Sectors situated further outward (which have a greater distance from the anchor display point) in this case correspond to higher alignment change speeds and sectors situated further inward (which have a smaller distance from the anchor display point) in this case correspond to lower alignment change speeds. As the distance between the respective sectors and the anchor display point (that is to say center point of the reticle) increases, therefore, the alignment change speed respectively assigned to the sectors also increases.

In this case, the sectors defined by the outermost circular line can also be assigned the highest movement speed (100%) and a marking of the anchor display point (that is to say of the center point of the reticle) can mean a movement speed of 0%.

Each sector 7 furthermore corresponds to a specific—that is to say assigned thereto—alignment change direction of the sighting unit 13 (azimuthal and elevational). When an image point e.g. to the right of the center point of the reticle is marked or touched, the sighting device 13 is moved toward the right for changing the alignment in a horizontal direction until the different image point mentioned above is no longer marked or touched (for example because now another different display point is marked—and then the sighting unit is moved further or changed further with the direction and speed assigned to said display point—or no point is marked anymore—and the movement of the sighting unit is then stopped). The situation illustrated in FIG. 3 (with the point illustrated here as currently marked display point 4) corresponds, for instance, to a change in the alignment of the sighting unit 13 with an alignment change direction upward obliquely toward the right (that is to say a direction change component pointing upward and a direction change component pointing rightward, wherein the component pointing upward is chosen to be somewhat greater than the component pointing rightward) and also with an average movement speed. In particular, for this purpose the rotary drives can be driven in such a way that the sighting unit pivots upward relative to the base at 60% of the maximum pivoting speed that can be provided, and rotates rightward about the vertical axis at 40% of the maximum rotational speed that can be provided.

In particular, in this case the line grid 3 is established in such a way that a multiplicity of sectors 7 are defined thereby, in particular at least approximately 30 sectors, specifically at least approximately 50 sectors.

It goes without saying that these illustrated figures merely illustrate possible exemplary embodiments schematically. The various approaches can likewise be combined with one another and also with methods and appliances from the prior art.

What is claimed is:

1. A measuring appliance for measuring spatial points of surfaces of a construction including interiors of buildings, the measuring apparatus comprising:
   a base;
   a sighting unit, which is rotatable and pivotable relative to the base and provides distance measuring functionality, having a laser source designed to emit a laser beam in the direction of an aiming axis, and a laser light detector and also having an integrated digital camera aligned in a direction of the aiming axis;
   an evaluation and control unit;
   a display for representing an image of the camera;
   input means for marking display points on the display;
   a first and a second rotary drive that make the sighting unit drivable and alignable;

a spatial alignment of the sighting unit relative to the base is detectable by means of two goniometers;

the evaluation and control unit is connected to the laser source, the laser light detector and also the goniometers in order to assign a detected distance to a corresponding alignment and thus to determine coordinates for spatial points, and is also connected to the camera;

wherein the measuring appliance is equipped with a functionality for changing the alignment of the sighting unit in a manually controllable manner, in the course of which functionality the alignment of the sighting unit is changed dynamically by the first and/or second rotary drive dependent on a continuously determined current direction and a continuously determined current distance from a defined central anchor display point to a currently marked display point; and wherein the respective current direction sets an alignment change direction and the respective current distance sets an alignment change speed for changing the alignment of the sighting unit; and wherein the alignment change speed depends on the respective current distance in such a way that:
  movement of the sighting unit is effected with maximum available speed if the current distance from the currently marked display point to the anchor display point is maximal; and
  the alignment change speed is equal to zero if the currently marked display point coincides with the anchor display point.

2. The measuring appliance as claimed in claim 1, wherein the anchor display point is defined as that display point which represents the position of the aiming axis in the image and thus a target image point.

3. The measuring appliance as claimed in claim 2, wherein the functionality for changing the alignment of the sighting unit can be activated by marking the reticle or the display point representing the target image point.

4. The measuring appliance as claimed claim 1, wherein the display is embodied as a touch-sensitive touchscreen, on which display points can be marked by touch, and the input means are thereby provided.

5. The measuring appliance as claimed in claim 1, wherein in the course of the functionality for changing the alignment of the sighting unit, the alignment change direction for changing the alignment of the sighting unit is analogous to the respective current direction from the anchor display point to the currently marked display point, wherein the alignment change direction is thus chosen in such a way that it:
  contains an upwardly directed component including the sighting unit which is pivoted upward about a horizontal pivoting axis if the current direction from the anchor display point to the currently marked display point contains an upwardly pointing component if the currently marked display point on the display is situated above the anchor display point;
  contains a downwardly directed component including the sighting unit is pivoted downward about the horizontal pivoting axis if the current direction from the anchor display point to the currently marked display point contains a downwardly pointing component if the currently marked display point on the display is situated below the anchor display point;
  contains a leftward directed component including the sighting unit is rotated leftward about a vertical rotation axis if the current direction from the anchor display point to the currently marked display point contains a leftward pointing component if the currently marked display point on the display is situated to the left of the anchor display point; and
  contains a rightward directed component including the sighting unit is rotated rightward about the vertical rotation axis if the current direction from the anchor display point to the currently marked display point contains a rightward pointing component if the currently marked display point on the display is situated to the right of the anchor display point.

6. The measuring appliance as claimed claim 1, wherein in the context course of the functionality for changing the alignment of the sighting unit:
  the alignment change speed is maximal if the current distance from the anchor display point to the currently marked display point is also maximal; and
  when the currently marked display point coincides with the anchor display point, the alignment change speed is equal to zero and a pause is then made in the current alignment of the sighting unit.

7. The measuring appliance as claimed in claim 1, wherein the display is subdivided into virtual sectors by means of a virtual line grid placed around the anchor display point, said grid being formed by concentric circular lines around the anchor display point and radial lines which proceed from the anchor display point and intersect said circular lines, wherein the sectors correspond to digitized values for the alignment change direction and the alignment change speed and the alignment of the sighting unit is changed with the alignment change direction and alignment change speed assigned to the respective sector for as long as one of the display points lying within said sector is marked, and the alignment change direction and alignment change speed are correspondingly changed as soon as a display point lying within a different sector is marked, namely to the alignment change direction and respectively alignment change speed corresponding to the different sector.

8. The measuring appliance as claimed in claim 7, wherein the concentric circular lines around the anchor display point correspond to different distances from the currently marked display point to the anchor display point, whereby alignment change speed levels are defined, wherein the outermost sectors correspond to the maximum alignment change speed.

9. The measuring appliance as claimed in claim 7, wherein the virtual line grid is established in such a way that a multiplicity of sectors are defined thereby.

10. The measuring appliance as claimed in claim 7, wherein the virtual line grid is established in such a way that a at least approximately 30 sectors are defined thereby.

11. The measuring appliance as claimed in claim 7, wherein the virtual line grid is established in such a way that at least approximately 50 sectors are defined thereby.

12. The measuring appliance as claimed in claim 1, wherein the anchor display point is defined as that display point which represents the position of the aiming axis in the image and thus a target image point and the latter is indicated on the display by a reticle that can be represented in a manner superimposed on the image.

13. A method for the manually controlled alignment of a sighting unit of a measuring appliance on the basis of marking display points on a display, wherein the measuring appliance comprises:
  a base;
  the sighting unit, which is rotatable and pivotable relative to the base and provides distance measuring functionality, having a laser source designed to emit a laser beam in the direction of an aiming axis, and a laser light detector and also having an integrated digital camera aligned in the direction of the aiming axis;

an evaluation and control unit;

the display for representing an image of the camera;

input means for marking the display points;

a first and a second rotary drive make the sighting unit drivable and alignable;

a spatial alignment of the sighting unit relative to the base is detectable by means of two goniometers;

the evaluation and control unit is connected to the laser source, the laser light detector and also the goniometers in order to assign a detected distance to a corresponding alignment and thus to determine coordinates for spatial points, and is also connected to the camera;

wherein a current direction and a current distance from a defined central anchor display point to a currently marked display point are continuously determined and the alignment of the sighting unit is changed dynamically dependent on the respective current direction and the respective current distance by the first and/or second rotary drive; and the respective current direction sets an alignment change direction and the respective current distance sets an alignment change speed for changing the alignment of the sighting uni;t, and wherein the alignment change speed depends on the respective current distance in such a way that:

movement of the sighting unit is effected with maximum available speed if the current distance from the currently marked display point to the anchor display point is maximal; and the alignment change speed is equal to zero if the currently marked display point coincides with the anchor display point.

14. The method as claimed in claim 13, wherein the anchor display point is defined as that display point which represents the position of the aiming axis in the image and thus a target image point.

15. The method as claimed in claim 13, wherein:

the alignment change direction for changing the alignment of the sighting unit is chosen analogously to the respective determined current direction from the anchor display point to the currently marked display point;

the alignment change direction contains an upwardly directed component—that is to say the sighting unit is pivoted upward about a horizontal pivoting axis—if the current direction from the anchor display point to the currently marked display point contains an upwardly pointing component—that is to say if the currently marked display point on the display is situated above the anchor display point;

the alignment change direction contains a downwardly directed component—that is to say the sighting unit is pivoted downward about the horizontal pivoting axis—if the current direction from the anchor display point to the currently marked display point contains a downwardly pointing component—that is to say if the currently marked display point on the display is situated below the anchor display point;

the alignment change direction contains a leftward directed component—that is to say the sighting unit is rotated leftward about a vertical rotation axis—if the current direction from the anchor display point to the currently marked display point contains a leftward pointing component—that is to say if the currently marked display point on the display is situated to the left of the anchor display point; and the alignment change direction contains a rightward directed component—that is to say the sighting unit is rotated rightward about a vertical rotation axis—if the current direction from the anchor display point to the currently marked display point contains a rightward pointing component—that is to say if the currently marked display point on the display is situated to the right of the anchor display point.

16. The method as claimed in 13, wherein:

the alignment change speed is maximal if the current distance from the currently marked display point to the anchor display point is maximal, and when the currently marked display point coincides with the anchor display point, the alignment change speed is equal to zero, that is to say that a pause is then made in the current alignment of the sighting unit.

17. The method as claimed in claim 13, wherein the display is subdivided into virtual sectors by means of a virtual line grid placed around the anchor display point, said grid being formed by concentric circular lines around the anchor display point and radial lines which proceed from the anchor display point and intersect said circular lines, wherein the sectors correspond to digitized values for the alignment change direction and the alignment change speed, and the alignment of the sighting unit is changed with the alignment change direction and alignment change speed assigned to the respective sector for as long as one of the display points lying within said sector is marked, and the alignment change direction and alignment change speed are correspondingly changed as soon as a display point lying within a different sector is marked, namely to the alignment change direction and respectively alignment change speed corresponding to the different sector.

18. A non-transitory computer program product comprising program code, stored on a machine-readable carrier, for carrying out the method for the manually controlled alignment of a sighting unit of a measuring appliance on the basis of marking display points on a display as claimed in claim 13.

19. The method as claimed in claim 13, wherein the anchor display point is defined as that display point which represents the position of the aiming axis in the image and thus a target image point, in particular wherein the latter is indicated on the display by a reticle that can be represented in a manner superimposed on the image.

* * * * *